(12) United States Patent
Nishikawa et al.

(10) Patent No.: US 10,434,502 B2
(45) Date of Patent: Oct. 8, 2019

(54) EXHAUST GAS-PURIFYING COMPOSITION

(71) Applicant: Mitsui Mining & Smelting Co., Ltd., Tokyo (JP)

(72) Inventors: Jo Nishikawa, Saitama (JP); Satoshi Watanabe, Saitama (JP); Michitaka Yamaguchi, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/307,768

(22) PCT Filed: Jul. 26, 2017

(86) PCT No.: PCT/JP2017/027124
§ 371 (c)(1),
(2) Date: Dec. 6, 2018

(87) PCT Pub. No.: WO2018/131196
PCT Pub. Date: Jul. 19, 2018

(65) Prior Publication Data
US 2019/0262815 A1  Aug. 29, 2019

(30) Foreign Application Priority Data
Jan. 13, 2017  (JP) ................................ 2017-003959

(51) Int. Cl.
*B01J 29/80* (2006.01)
*B01J 23/648* (2006.01)
(Continued)

(52) U.S. Cl.
CPC ........... *B01J 29/80* (2013.01); *B01J 23/6482* (2013.01); *C10G 11/05* (2013.01); *F01N 3/035* (2013.01);
(Continued)

(58) Field of Classification Search
None
See application file for complete search history.

(56) References Cited

U.S. PATENT DOCUMENTS

| 4,985,210 A | 1/1991 | Minami |
| 6,589,901 B2 | 7/2003 | Yamamoto |
(Continued)

FOREIGN PATENT DOCUMENTS

| CN | 1327396 A | 12/2001 |
| CN | 1366467 A | 8/2002 |
(Continued)

OTHER PUBLICATIONS

JP2000-126590A English Translation (Year: 2000).*
International Search Report (ISR) dated Oct. 3, 2017 filed in PCT/JP2017/027124.

*Primary Examiner* — Anita Nassiri-Motlagh
(74) *Attorney, Agent, or Firm* — Rankin, Hill & Clark LLP

(57) ABSTRACT

The present invention provides an exhaust gas purifying composition containing BEA zeolite containing phosphorus, wherein an amount of phosphorus is such that a molar ratio thereof with respect to Al in the zeolite is 0.5 or greater, and a maintaining factor $R_S$ of a specific surface area of the exhaust gas purifying composition after heating at 980° C. for 25 hours is 35% or greater. Furthermore, the present invention also provides an exhaust gas purifying composition containing phosphorus-containing zeolite, wherein an amount of phosphorus is such that a molar ratio thereof with respect to Al in the zeolite is from 0.5 to 8, and a maintaining factor $R_d$ of a crystallite diameter after heating at 980° C. for 25 hours is 50% or greater. The exhaust gas purifying composition of the present invention has excellent HC purifiability for exhaust gas purification in internal combustion engines such as gasoline engines.

9 Claims, 1 Drawing Sheet

Before heating

After heating

(51) Int. Cl.
  *F01N 3/035* (2006.01)
  *C10G 11/05* (2006.01)
(52) U.S. Cl.
  CPC .... *F01N 2370/04* (2013.01); *F01N 2510/063* (2013.01)

(56) References Cited

U.S. PATENT DOCUMENTS

| | | |
|---|---|---|
| 6,887,444 B1 | 5/2005 | Yamamoto |
| 7,695,703 B2 | 4/2010 | Sobolevskiy et al. |
| 2002/0198098 A1 | 12/2002 | Yamamoto |
| 2003/0012707 A1 | 1/2003 | Yamamoto et al. |
| 2009/0196813 A1 | 8/2009 | Sobolevskiy et al. |

FOREIGN PATENT DOCUMENTS

| | | |
|---|---|---|
| CN | 106140290 A | 11/2016 |
| JP | 7256114 | 10/1995 |
| JP | 1190226 A2 | 4/1999 |
| JP | 11300211 A2 | 11/1999 |
| JP | 2000126590 A * | 5/2000 |
| JP | 2000126590 A2 | 5/2000 |
| JP | 2001149787 A2 | 6/2001 |
| JP | 2003071250 A2 | 3/2003 |
| JP | 2011510808 | 4/2011 |
| JP | 2012239924 A2 | 12/2012 |
| JP | 2015196115 A2 | 11/2015 |

* cited by examiner

EXHAUST GAS-PURIFYING COMPOSITION

TECHNICAL FIELD

The present invention relates to an exhaust gas purifying composition containing zeolite.

BACKGROUND ART

Exhaust gas emitted from internal combustion engines such as gasoline engines and diesel engines of automobiles and motorbikes (alternatively referred to as "saddled vehicles") contains harmful components such as hydrocarbon (HC), carbon monoxide (CO), nitrogen oxide (NOx), and the like. In particular, the purification of HC using a catalyst is significantly affected by the exhaust gas temperature, and, generally, a high temperature of 300° C. or more is required. Accordingly, when the exhaust gas temperature is low immediately after an internal combustion engine is started, it is difficult to purify HC using a catalyst. Moreover, immediately after an internal combustion engine is started, a large amount of HC tends to be emitted, and the proportion of HC in the entire emission amount is large when the exhaust gas temperature is low. Thus, the removal of HC from an internal combustion engine immediately after an internal combustion engine is started is a conventional problem.

Patent Literature 1 describes the use of a proton zeolite such as mordenite, as an HC adsorbent. Furthermore, Patent Literature 2 describes the use of $Cu^{2+}$ exchange CHA zeolite, as a selective contact reduction catalyst for exhaust gas purification. Furthermore, Patent Literature 3 describes the use of phosphorus-supporting zeolite, as a catalytic cracking catalyst for hydrocarbons.

CITATION LIST

Patent Literature

Patent Literature 1: U.S. Pat. No. 4,985,210A
Patent Literature 2: JP 2015-196115A
Patent Literature 3: JP 2012-239924A

SUMMARY OF INVENTION

However, the proton zeolite as described in Patent Literature 1 is not sufficiently hydrothermally stable, and thus, if it is used for exhaust gas purification in internal combustion engines such as gasoline engines, sufficient HC adsorbability cannot be obtained. Furthermore, when using CHA zeolite as in Patent Literature 2, toluene, which is contained in a particularly large amount among the HC molecular species in the emission, cannot be adsorbed, and thus excellent HC purifiability cannot be obtained.

Meanwhile, the technique described in Patent Literature 3 uses phosphorus-containing zeolite merely for cracking hexane or the like at approximately 550° C. This document neither describes nor suggests the use of phosphorus-containing zeolite for exhaust gas purification applications where resistance to high temperatures such as 900 to 1000° C. is required, and, furthermore, neither describes nor suggests any specific configuration required of the zeolite-containing purifying catalyst in such applications.

It is an object of the present invention to provide an exhaust gas purifying composition that can solve various disadvantages of conventional techniques described above.

The present invention provides an exhaust gas purifying composition comprising BEA zeolite containing phosphorus, wherein an amount of phosphorus is such that a molar ratio thereof with respect to Al in the zeolite is 0.5 or greater, and when (a1) A represents a specific surface area of the exhaust gas purifying composition after heating at 980° C. for 25 hours, and (a2) B represents a specific surface area of the exhaust gas purifying composition before the heating, a maintaining factor $R_S$ of a specific surface area of the exhaust gas purifying composition represented by A/B×100 (%) is 35% or greater.

The present invention also provides an exhaust gas purifying composition comprising BEA zeolite containing phosphorus, wherein an amount of phosphorus is such that a molar ratio thereof with respect to Al in the zeolite is from 0.5 to 8, when (b1) X represents a crystallite diameter after heating the exhaust gas purifying composition at 980° C. for 25 hours, and (b2) Y represents a crystallite diameter before the heating, X is 25 nm or less, and a maintaining factor $R_d$ of a crystallite diameter represented by X/Y×100(%) is 50% or greater.

DESCRIPTION OF EMBODIMENT

Figure 1A:
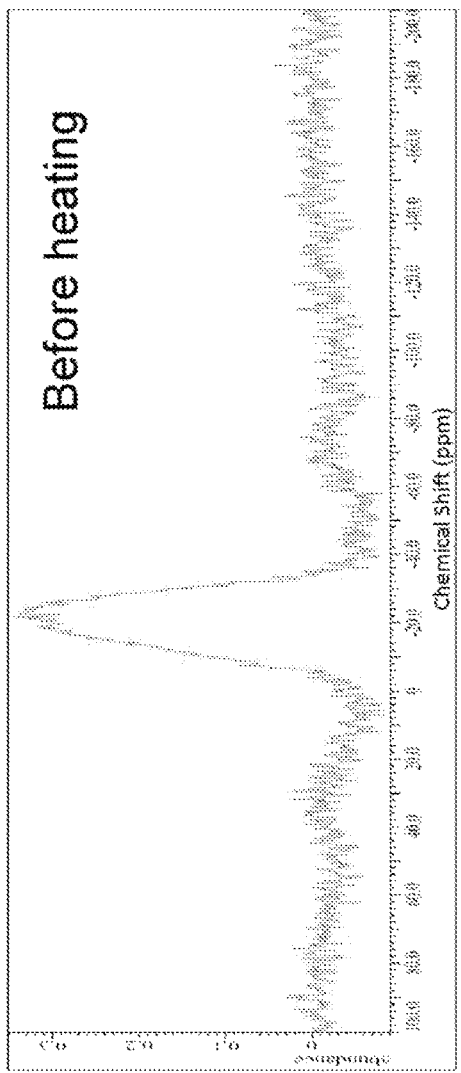
FIG. 1(a) and FIG. 1(b) are $^{31}$P-NMR charts before and after a heat resistance test was carried out on an exhaust gas purifying composition of Example 2.

Hereinafter, the present invention will be described based on a preferred embodiment thereof.

An exhaust gas purifying composition of this embodiment contains zeolite. Zeolite refers to a crystalline substance in which $TO_4$ units (T is a central atom) having a tetrahedron structure are covalently bonded to each other via 0 atoms in a three-dimensional manner and form open regular micropores. Specific examples thereof include silicate, germanate, arsenate, and the like listed in the Structure Commission Database of the International Zeolite Association (hereinafter, also may be referred to as "IZA").

Examples of silicate include aluminosilicate, gallosilicate, phyllosilicate, titanosilicate, and borosilicate, examples of germanate include aluminogermanate, and examples of arsenate include aluminoarsenate. These examples include structures obtained by substituting Si or Al in the framework with a divalent or trivalent cation of Ti, Ga, Mg, Mn, Fe, Co, Zn, or the like. In this embodiment, it is preferable to use crystalline aluminosilicate as the zeolite.

The exhaust gas purifying composition contains BEA zeolite. The BEA zeolite may be either synthetic zeolite or natural zeolite, and there is no particular limitation on the method for producing zeolite when it is synthetic zeolite.

Since the exhaust gas purifying composition of this embodiment contains BEA zeolite, the composition is excellent in terms of adsorbability of toluene, which is contained in a large amount as an HC molecular species in the exhaust gas. BEA zeolite typically has a pore diameter of approximately 0.65 nm. The pore diameter refers to a crystallographic free diameter of the channels as defined by IZA. The pore diameter refers to an average diameter when the pores (channels) are each in the shape of a perfect circle, and refers to a shorter axis when the pores are each in a shape that is elongated in one direction as in an ellipse.

The $SiO_2/Al_2O_3$ molar ratio of the phosphorus-containing BEA zeolite contained in the exhaust gas purifying composition is preferably from 25 to 600, more preferably from 28 to 400, even more preferably from 30 to 200, and still more preferably from 30 to 100, because the BEA structure of zeolite can be more reliably maintained and HC adsorbability can be easily obtained. The $SiO_2/Al_2O_3$ molar ratio of the phosphorus-containing BEA zeolite can be measured using the method in the examples, which will be described later.

The BEA zeolite in the exhaust gas purifying composition of the present invention contains phosphorus, thus the BEA structure of zeolite can be effectively maintained even under a severe heat environment, and high HC adsorbability can be obtained. The phosphorus in the exhaust gas purifying composition is preferably supported by the BEA zeolite. The state in which phosphorus is supported by the zeolite refers to a state of being physically or chemically adsorbed or held on the outer surface of the zeolite or the inner surface of the pores. The chemical adsorption also includes ionic bonding.

The amount of phosphorus contained in the exhaust gas purifying composition is such that a molar ratio (P/Al) thereof with respect to Al in the zeolite is preferably 0.5 or greater. Accordingly, the exhaust gas purifying composition can easily obtain the effect of obtaining high HC adsorbability even under a severe heat environment, derived from the presence of phosphorus.

The amount of phosphorus contained in the exhaust gas purifying composition is such that the molar ratio (P/Al) thereof with respect to Al in the zeolite is preferably 8 or less. Accordingly, the exhaust gas purifying composition can more reliably obtain high HC adsorbability. From these points of view, the amount of phosphorus in the exhaust gas purifying composition is such that the molar ratio (P/Al) thereof with respect to Al in the zeolite is more preferably from 0.5 to 5, and even more preferably from 1 to 3. The molar ratio (P/Al) can be measured using the method in the examples, which will be described later.

If the BEA zeolite in the exhaust gas purifying composition further contains zirconium in addition to phosphorus, the composition more reliably maintains the BEA structure of zeolite when exposed to high temperatures, and the HC adsorbability when used for exhaust gas purification in a gasoline engine and the like can be further improved. The amount of zirconium contained in the exhaust gas purifying composition is such that a molar ratio (Zr/Al) thereof with respect to Al in the zeolite is preferably 0.25 or greater, because the effect of improving the HC adsorbability, derived from the presence of zirconium, can be easily obtained. Furthermore, the amount of zirconium is such that the molar ratio (Zr/Al) thereof with respect to Al in the zeolite is preferably 8 or less. From these points of view, the amount of zirconium is such that the molar ratio (Zr/Al) thereof with respect to Al in the zeolite is more preferably from 0.25 to 4, even more preferably from 0.25 to 2, still more preferably from 0.25 to 1, and especially preferably from 0.5 to 1. The molar ratio (Zr/Al) can be measured using the method in the examples, which will be described later. The zirconium is preferably supported by the zeolite. The state in which zirconium is supported by the zeolite refers to a state of being physically or chemically adsorbed or held on the outer surface of the zeolite or the inner surface of the pores. The chemical adsorption also includes ionic bonding.

When the exhaust gas purifying composition of this embodiment after being heated at 980° C. for 25 hours is subjected to $^{31}P$-NMR measurement using an 85% by mass $H_3PO_4$ aqueous solution, a peak may be observed in the range of −35 to −20 ppm, and more preferably −34 to −21 ppm. This peak is derived from an Al—O—P bond of the phosphorus-containing BEA zeolite. Furthermore, in the case where the exhaust gas purifying composition of this embodiment contains zirconium, when the composition after being heated at 980° C. for 25 hours is subjected to the $^{31}P$-NMR measurement, a peak may also be observed in the range of −50 to −35 ppm, and more preferably −49 to −36 ppm, as well. This peak is derived from a Zr—O—P bond of the phosphorus-containing BEA zeolite. However, these peaks do not prescribe the state of P or Zr in the exhaust gas purifying composition before being heated.

The heating corresponds to a hydrothermal stability test that is performed under Heat Resistance Test Conditions in the examples, which will be described later. As is described in the conditions of the test, the thermal resistance in this specification includes moist heat resistance. $^{31}P$-NMR measurement is performed using the method in the examples, which will be described later.

The BEA zeolite may contain other elements in addition to P and Zr. As such elements, rare earth elements, transition metal elements other than rare earth elements, alkaline earth metal elements, alkali metal elements, other metal elements, semiconductor elements, and the like may be used without any particular limitation.

The exhaust gas purifying composition preferably has the following configuration (1) and/or (2) in addition to containing the phosphorus-containing BEA zeolite, because the HC adsorbability of the exhaust gas purifying composition can be significantly improved compared with conventional cases.

(1) the amount of phosphorus is such that the molar ratio thereof with respect to Al in the zeolite is 0.5 or greater, and when (a1) A represents a specific surface area of the exhaust gas purifying composition after heating at 980° C. for 25 hours, and (a2) B represents a specific surface area of the exhaust gas purifying composition before the heating, a maintaining factor $R_S$ of a specific surface area of the exhaust gas purifying composition represented by A/B×100 (%) is 35% or greater.

(2) the amount of phosphorus is such that the molar ratio thereof with respect to Al in the zeolite is from 0.5 to 8, and when (b1) X represents a crystallite diameter after heating the exhaust gas purifying composition at 980° C. for 25 hours, and (b2) Y represents a crystallite diameter before the heating, X is 25 nm or less, and a maintaining factor $R_d$ of a crystallite diameter represented by X/Y×100(%) is 50% or greater.

Hereinafter, the case of (1) will be described in more detail.

As described above, an exhaust gas purifying composition used in gasoline engines is typically required to be resistant to high temperatures such as 900 to 1000° C. The maintaining factor $R_S$ of the specific surface area of the exhaust gas purifying composition obtained through heating indicates the resistance of the zeolite structure to high temperatures. If the exhaust gas purifying composition has the maintaining factor $R_S$ of the specific surface area of the exhaust gas purifying composition of 35% or greater, the zeolite structure is resistant to high temperatures, and thus high HC adsorbing activity can be easily exerted.

The exhaust gas purifying composition preferably has the maintaining factor $R_S$ of the specific surface area of the exhaust gas purifying composition of 35% or greater, because high heat resistance allows the HC adsorbability to be maintained. From these points of view, the maintaining factor $R_S$ of the specific surface area of the exhaust gas purifying composition is preferably 40% or greater. The heating can be performed under the conditions in the examples, which will be described later. The specific surface areas of the exhaust gas purifying composition can be measured using the method in the examples, which will be described later. The maintaining factor $R_S$ of the specific surface area of the exhaust gas purifying composition can be set by adjusting the amount of phosphorus used or the amount of metal used for support as necessary during production of the exhaust gas purifying composition using a preferred production method, which will be described later.

In the exhaust gas purifying composition, the specific surface area B of the exhaust gas purifying composition before the heating is preferably 150 m²/g or greater, and 200 m²/g or greater, because good HC adsorbability can be more easily obtained. The specific surface area of the exhaust gas purifying composition can be measured using the method in the examples, which will be described later. The specific surface area A of the exhaust gas purifying composition after heating is preferably 100 m²/g or greater, and more preferably 150 m²/g or greater, because good HC adsorbability can be more easily obtained.

The exhaust gas purifying composition preferably has a maintaining factor $R_d$ of the crystallite diameter in (2) above of 50% or greater, because high heat resistance allows the HC adsorbability to be maintained. From these points of view, the maintaining factor $R_d$ of the crystallite diameter is more preferably 60% or greater, and even more preferably 70% or greater. The heating can be performed under the conditions in the examples, which will be described later. The crystallite diameter can be measured using the method in the examples, which will be described later. The maintaining factor $R_d$ of the crystallite diameter can be set to a preferred value by adjusting the amount of phosphorus or supporting elements used or the type of zeolite during production using a preferred production method, which will be described later.

Furthermore, if the exhaust gas purifying composition has a zeolite crystallite diameter X of 25 nm or less after heating at 980° C. for 25 hours, high adsorbability of HC, in particular, toluene can be obtained.

Furthermore, the crystallite diameter X is preferably 2 nm or greater, because the zeolite structure can be easily maintained even under a severe heat environment, and a constant HC adsorbability can be easily obtained. From these points of view, the crystallite diameter X is more preferably from 3 to 20 nm, and even more preferably from 5 to 15 nm.

Furthermore, the crystallite diameter Y of the zeolite before heating is preferably from 5 to 50 nm, and even more preferably from 10 to 30 nm, because preferred toluene adsorbability can be easily obtained.

Next, a preferred method for producing the exhaust gas purifying composition of this embodiment will be described.

A preferred method for producing the exhaust gas purifying composition of this embodiment includes a first step of preparing a dispersion or solution in which phosphorus is dispersed or dissolved in a liquid medium, a second step of bringing BEA zeolite into contact with the dispersion or solution, and a third step of firing an obtained treated material.

If the exhaust gas purifying composition is to contain zirconium and other elements in addition to phosphorus, in the first step, it is preferable to disperse or dissolve zirconium and other elements in addition to phosphorus in the liquid medium.

First Step

Examples of phosphorus that is dispersed or dissolved in the liquid medium include phosphoric acid and salts thereof. Examples of phosphoric acid include orthophosphoric acid ($H_3PO_4$), pyrophosphoric acid ($H_4P_2O_7$), triphosphoric acid ($H_5P_3O_{10}$), polyphosphoric acid, metaphosphoric acid ($HPO_3$), and ultraphosphoric acid. Furthermore, examples of phosphate include orthophosphate, pyrophosphate, triphosphate, polyphosphate, metaphosphate, and ultraphosphate. Examples of salts thereof include alkali metal salts, other metal salts, and ammonium salts.

Preferable examples of the liquid medium include water.

If zirconium is used in the first step, it is preferable to disperse or dissolve a water-soluble zirconium salt in the liquid medium. Preferable examples of the water-soluble zirconium salt include zirconium chloride ($ZrCl_4$), zirconium oxychloride ($ZrOCl_2 \cdot nH_2O$), zirconium sulfate ($Zr(SO_4)_2 \cdot nH_2O$), zirconium oxysulfate ($ZrOSO_4 \cdot nH_2O$), zirconium nitrate ($Zr(NO_3)_4 \cdot nH_2O$), zirconium oxynitrate ($ZrO(NO_3)_2 \cdot nH_2O$), zirconium diacetate ($Zr(CH_3COO)_2$), zirconium tetraacetate ($Zr(CH_3COO)_4$), zirconium oxyacetate ($ZrO(CH_3COO)_2$), ammonium zirconium carbonate (($NH_4)_2ZrO(CO_3)_2$), and zirconium alkoxide.

The amount of phosphorus in the dispersion or the solution is such that, for example, if phosphorus is contained as orthophosphoric acid ions, the number of moles of orthophosphoric acid ions is preferably from 0.005 to 3 mol/L, and more preferably from 0.01 to 2 mol/L. In the case where the dispersion or the solution further contains zirconium, the amount of zirconium in the dispersion or the solution is such that the number of moles of zirconium ions is preferably from 0.005 to 1.5 mol/L, and more preferably from 0.01 to 1 mol/L.

Second Step

In the second step, those described above can be used as BEA zeolite that is brought into contact with the dispersion or solution. As BEA zeolite that is brought into contact with the dispersion or solution, it is possible to use those in which the $SiO_2/Al_2O_3$ molar ratio is similar to that of the above-described phosphorus-containing BEA zeolite, and also to use those in which the specific surface area is similar to the preferable specific surface area of the above-described phosphorus-containing BEA zeolite. The zeolite that is brought into contact with the dispersion or solution may be of a proton-type, a sodium-type, an ammonium-type, or the like, and is preferably of a proton-type.

The contact treatment may be performed by spraying the dispersion or solution onto the BEA zeolite, or by immersing the BEA zeolite in the dispersion or solution. During immersion, the BEA zeolite may be or may not be stirred in the dispersion or the solution. When bringing the BEA zeolite into contact with the dispersion or solution, the proportion of the BEA zeolite with respect to 100 parts by mass of the dispersion or solution is preferably from 1 to 40 parts by mass, and more preferably from 2 to 30 parts by mass.

The contact treatment between the BEA zeolite and the dispersion or solution may be performed at room temperature, or under a heated condition. The temperature for the contact treatment is preferably from 5 to 200° C., and more preferably from 10 to 100° C.

Third Step

In the third step, a treated material obtained in the contact treatment of the second step is fired. Typically, the firing is preferably performed on a dried material obtained by drying a solid obtained through filtering of a slurry obtained in the second step. It is sufficient that the drying is performed until moisture has substantially disappeared, and is performed, for example, at 100° C. or more for about a few to 10 or plus hours.

The firing is performed, for example, under atmospheric pressure in view of processes and cost. Furthermore, the firing temperature is preferably 400° C. or more, in order to allow phosphorus to be stably contained in the BEA zeolite, and to remove unnecessary raw materials. The firing temperature is preferably 1100° C. or less, and more preferably 1000° C. or less, in order to maintain the BEA structure. From these points of view, the firing temperature is more preferably from 500 to 700° C. Given that the firing temperature is within the above-described range, the firing time is preferably from 1 to 5 hours, and more preferably from 2 to 4 hours.

The thus obtained exhaust gas purifying composition maintains the BEA structure of zeolite, and exerts stable HC adsorbability, even when exposed to high temperatures of approximately from 900 to 1100° C. (in particular 1000° C. or less). Such an exhaust gas purifying composition can exert stable and high exhaust gas purifiability, as a composition for exhaust gas purification in internal combustion engines such as gasoline engines or diesel engines using a fossil fuel as a motive power source. In particular, the exhaust gas purifying composition of this embodiment is preferably used to purify exhaust gas emitted from gasoline engines of automobiles, motorbikes, and the like due to its high thermal resistance. The exhaust gas purifying composition of this embodiment is effectively used to remove elements in exhaust gas, especially hydrocarbon (HC).

Accordingly, the present invention also provides an exhaust gas purification method using the exhaust gas purifying composition of the present invention, and more preferably an exhaust gas purification method for removing hydrocarbon contained in exhaust gas, the exhaust gas is emitted into exhaust passages of internal combustion engines.

The exhaust gas purifying composition of this embodiment may be in any form such as a powder, paste, or a granule. For example, the exhaust gas purifying composition of this embodiment can be used as a catalyst layer supported on a catalyst support. This catalyst support is made of, for example, a ceramic or a metal material. Furthermore, there is no particular limitation on the shape of the catalyst support, but it is typically in the shape of honeycomb, plates, pellets, a DPF, a GPF, or the like, and is preferably in the shape of honeycomb, a DPF, or a GPF. Furthermore, examples of the material for the catalyst support include ceramics such as alumina ($Al_2O_3$), mullite ($3Al_2O_3 \cdot 2SiO_2$), cordierite ($2MgO \cdot 2Al_2O_3 \cdot 5SiO_2$), aluminum titanate ($Al_2TiO_5$), and silicon carbide (SiC), and metal materials such as stainless steel.

Furthermore, the exhaust gas purifying composition of this embodiment may be used as a catalyst layer formed on a catalyst support as described above, and a conventional catalyst layer made of a conventionally known catalyst material may be stacked on the catalyst layer, or, conversely, a conventional catalyst layer made of a conventionally known catalyst material may be stacked on a catalyst support, and then a catalyst layer containing the exhaust gas purifying composition of this embodiment may be formed on the conventional catalyst layer. Furthermore, a catalyst layer in which the exhaust gas purifying composition of this embodiment and a conventionally known catalyst material are mixed may be formed on a catalyst support.

EXAMPLES

Hereinafter, the present invention will be described in more detail by way of examples. However, the scope of the present invention is not limited to these examples. Unless otherwise described, "%" refers to "% by mass". In the examples and comparative examples below, crystalline aluminosilicate was used as raw material zeolite.

Example 1

0.525 g of phosphoric acid ($H_3PO_4$) and 2.45 g of zirconium oxynitrate ($ZrO(NO_3)_2 \cdot 2H_2O$) were suspended in 50 g of pure water. 10 g of proton-type BEA zeolite ($SiO_2/Al_2O_3$ molar ratio 35, specific surface area 660 m$^2$/g) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Example 2

A powder-like exhaust gas purifying composition was obtained as in Example 1, except that the amount of phosphoric acid was changed to 1.05 g.

Example 3

A powder-like exhaust gas purifying composition was obtained as in Example 1, except that the amount of phosphoric acid was changed to 2.10 g.

Example 4

A powder-like exhaust gas purifying composition was obtained as in Example 1, except that the amount of phosphoric acid was changed to 4.20 g.

Example 5

A powder-like exhaust gas purifying composition was obtained as in Example 1, except that the amount of phosphoric acid was changed to 2.10 g, and the amount of zirconium oxynitrate was changed to 4.90 g.

Example 6

A powder-like exhaust gas purifying composition was obtained as in Example 1, except that the amount of phosphoric acid was changed to 4.20 g, and the amount of zirconium oxynitrate was changed to 9.80 g.

Example 7

A powder-like exhaust gas purifying composition was obtained as in Example 2, except that zirconium oxynitrate was not used.

Comparative Example 1

A powder-like exhaust gas purifying composition was obtained as in Example 1, except that phosphoric acid and zirconium oxynitrate were not used.

Comparative Example 2

A powder-like exhaust gas purifying composition was obtained as in Example 1, except that phosphoric acid was not used.

Comparative Example 3

A powder-like exhaust gas purifying composition was obtained as in Example 1, except that the amount of phosphoric acid was changed to 0.2625 g.

Comparative Example 4

A powder-like exhaust gas purifying composition was obtained as in Example 1, except that the amount of phosphoric acid was changed to 10.50 g.

Comparative Example 5

A powder-like exhaust gas purifying composition was obtained as in Example 1, except that the amount of phosphoric acid was changed to 10.50 g, and the amount of zirconium oxynitrate was changed to 24.50 g.

Comparative Example 6

CHA zeolite (pore diameter 0.4 nm, SSZ13, $SiO_2/Al_2O_3$ molar ratio 29, specific surface area 650 $m^2/g$) was used instead of the BEA zeolite, and phosphoric acid and zirconium oxynitrate were not used. A powder-like exhaust gas purifying composition was obtained as in Example 1, except for these points.

Comparative Example 7

1.25 g of phosphoric acid ($H_3PO_4$) and 2.93 g of zirconium oxynitrate ($ZrO(NO_3)_2 \cdot 2H_2O$) were suspended in 50 g of pure water. 10 g of CHA zeolite (SSZ13, pore diameter 0.4 nm, $SiO_2/Al_2O_3$ molar ratio 29, specific surface area 650 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Comparative Example 8

CHA zeolite (pore diameter 0.4 nm, SAPO34, $SiO_2/Al_2O_3$ molar ratio 0.4, specific surface area 630 $m^2/g$) was used, and phosphoric acid and zirconium oxynitrate were not used. A powder-like exhaust gas purifying composition was obtained as in Example 1, except for these points.

Comparative Example 9

3.77 g of phosphoric acid ($H_3PO_4$) and 4.41 g of zirconium oxynitrate ($ZrO(NO_3)_2 \cdot 2H_2O$) were suspended in 50 g of pure water. 10 g of CHA zeolite (SAPO34, pore diameter 0.4 nm, $SiO_2/Al_2O_3$ molar ratio 0.4, specific surface area 630 $m^2/g$) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Each of the exhaust gas purifying compositions (zeolite containing or not containing phosphorus) obtained in Examples 1 to 7 and Comparative Examples 1 to 9 was evaluated as follows. Table 1 below shows the results.

$SiO_2/Al_2O_3$ Molar Ratio

An Si amount and an Al amount in the exhaust gas purifying composition were measured using an X-ray fluorescence spectrometer (model number: ZSX Primus II) manufactured by Rigaku Corporation as a composition analyzer. A measurement sample was prepared as follows. An $SiO_2/Al_2O_3$ molar ratio was calculated from the obtained Si amount and Al amount.

Method for Preparing Measurement Sample

A measurement sample was prepared by placing and compression-molding the exhaust gas purifying composition into a vinyl chloride tube with a diameter of 30 mm.

Phosphorus Content and Zirconium Content

A P amount, a Zr amount, and an Al amount in the exhaust gas purifying composition were measured using an X-ray fluorescence spectrometer (model number: ZSX Primus II) manufactured by Rigaku Corporation as a composition analyzer. A measurement sample was prepared as follows. A molar ratio (P/Al) was calculated from the obtained measured values, and taken as a P content with respect to Al in the zeolite. Also, a molar ratio (Zr/Al) was calculated from the obtained measured values, and taken as a Zr content with respect to Al in the zeolite.

Method for Preparing Measurement Sample

A measurement sample was prepared by placing and compression-molding the exhaust gas purifying composition into a vinyl chloride tube with a diameter of 30 mm.

Maintaining Factor $R_S$ of Specific Surface Area

A specific surface area A $m^2/g$ of the exhaust gas purifying composition after a heat resistance test was performed under the following conditions and a specific surface area B $m^2/g$ of the exhaust gas purifying composition before the test were measured. Then, a maintaining factor of the specific surface area was obtained as A/B×100(%). The specific surface areas were obtained according to the 3-point BET method using a specific surface area/pore distribution analyzer (model number: QUADRASORB SI) manufactured by Quantachrome Instruments. Helium was used as the gas for the measurement.

Heat Resistance Test Conditions

The following cycle was performed at 980° C.×25 hours in a 10% by volume $H_2O$ atmosphere.

Cycle: Model gas with the following composition at 3 L/min for 80 secs, and air at 3 L/min for 20 secs were alternately supplied.

Model gas composition: $C_3H_6$ 70 mL/min, $O_2$ 70 mL/min, and $N_2$ balance

10% by volume $H_2O$ was evaporated from a water-containing tank, and mixed into the model gas or air as vapor. The saturated vapor pressure was adjusted through temperature, so that the above-described vapor amount in % by volume was obtained.

Figure 1B:
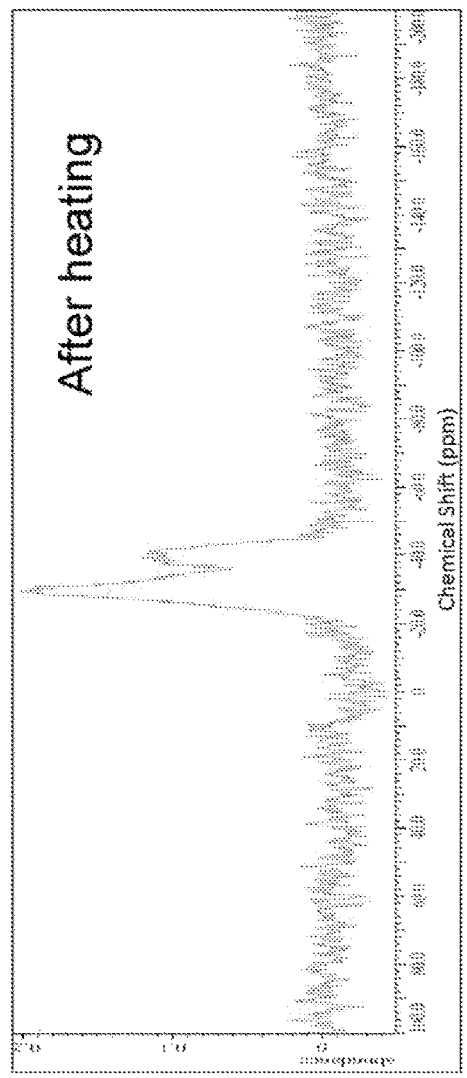

The exhaust gas purifying composition in Example 2 was subjected to $^{31}$P-NMR measurement before and after the heat resistance test. FIG. 1 shows the results.

$^{31}$P-NMR Measurement Conditions

The exhaust gas purifying composition that was to be measured was set in a zirconium oxide sample tube with a diameter of 6 mm, and measured using an ECA400 manufactured by JEOL Ltd. under the following conditions.

85% $H_3PO_4$ aqueous solution was used as the standard, and taken as 0 ppm. Sample spinning speed: 7 kHz, pulse: 90 degrees, repetition time: 30 seconds, and number of acquisitions: 64 times Toluene Adsorbability 200 mg of each of the exhaust gas purifying compositions obtained in the examples and the comparative examples that had been subjected to the heat resistance test under the above-described conditions was filled into a flow reactor, and caused to flow with evaluation gas having the composition below at 50° C. and at a flow rate 30 L/min for 30 minutes, so that toluene was adsorbed. Toluene was desorbed using the temperature-programmed desorption method, and the toluene desorption amount was measured using a mass spectrometer. Table 1 shows the amount in an arbitrary unit when the toluene adsorption amount in Example 2 is taken as 100%. The temperature-programmed desorption of toluene was performed using a fully automated chemisorption analyzer AutoChem II 2920 manufactured by Micromeritics, and the desorption amount was measured using an AutoChem Cirrus 2 manufactured by Micromeritics.

Composition of gas for evaluating toluene adsorbability: toluene 0.1% by volume, and He balance greater, synergistic effects of improving the HC adsorbability can be achieved, which is useful for exhaust gas purification.

Example 8

0.97 g of phosphoric acid ($H_3PO_4$) and 2.26 g of zirconium oxynitrate ($ZrO(NO_3)_2 \cdot 2H_2O$) were suspended in 50 g of pure water. 10 g of proton-type BEA zeolite (pore diameter 0.65 nm, $SiO_2/Al_2O_3$ molar ratio 38, specific surface area 620 m²/g) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Example 9

0.92 g of phosphoric acid ($H_3PO_4$) and 2.16 g of zirconium oxynitrate ($ZrO(NO_3)_2 \cdot 2H_2O$) were suspended in 50 g

TABLE 1

| | Exhaust gas purifying composition | | | | | | Evaluation | |
|---|---|---|---|---|---|---|---|---|
| | Zeolite type | Pore diameter (nm) | $SiO_2/Al_2O_3$ molar ratio | P/Al | Zr/Al | Specific surface area before heating (m²/g) B | Specific surface area after heating (m²/g) A | Maintaining factor $R_s$ (A/B) | Toluene adsorption amount (a.u.) |
|---|---|---|---|---|---|---|---|---|---|
| Ex. 1 | BEA | 0.65 | 35 | 0.5 | 1 | 611.5 | 234.4 | 38.3% | 71.7 |
| Ex. 2 | BEA | 0.65 | 35 | 1 | 1 | 571.6 | 339.0 | 59.3% | 100.0 |
| Ex. 3 | BEA | 0.65 | 35 | 2 | 1 | 513.1 | 304.7 | 59.4% | 117.8 |
| Ex. 4 | BEA | 0.65 | 35 | 4 | 1 | 264.6 | 152.6 | 57.7% | 75.9 |
| Ex. 5 | BEA | 0.65 | 35 | 2 | 2 | 539.7 | 239.2 | 44.3% | 92.0 |
| Ex. 6 | BEA | 0.65 | 35 | 4 | 4 | 221.8 | 98.0 | 44.2% | 48.8 |
| Ex. 7 | BEA | 0.65 | 35 | 1 | 0 | 616.9 | 272.0 | 44.1% | 76.9 |
| Com Ex. 1 | BEA | 0.65 | 35 | 0 | 0 | 663.9 | 19.3 | 2.9% | 0.0 |
| Com Ex. 2 | BEA | 0.65 | 35 | 0 | 1 | 618.8 | 158.1 | 25.5% | 10.4 |
| Com Ex. 3 | BEA | 0.65 | 35 | 0.25 | 1 | 305.1 | 8.3 | 2.7% | 0.1 |
| Com Ex. 4 | BEA | 0.65 | 35 | 10 | 1 | 249.5 | 58.6 | 23.5% | 24.6 |
| Com Ex. 5 | BEA | 0.65 | 35 | 10 | 10 | 254.7 | 78.7 | 30.9% | 12.7 |
| Com Ex. 6 | CHA (SSZ13) | 0.40 | 29 | 0 | 0 | 648.4 | 5.4 | 0.8% | 0.0 |
| Com Ex. 7 | CHA (SSZ13) | 0.40 | 29 | 1 | 1 | 676.2 | 552.9 | 81.8% | 0.0 |
| Com Ex. 8 | CHA (SAPO34) | 0.40 | 0.4 | 0 | 0 | 630.0 | 10.0 | 1.6% | 0.0 |
| Com Ex. 9 | CHA (SAPO34) | 0.40 | 0.4 | 1 | 1 | 287.0 | 201.2 | 70.1% | 0.0 |

It is seen from Table 1 that the compositions of the examples using zeolite that was of a BEA type and contained at least the specific amount of phosphorus, and having a maintaining factor of the specific surface area of the specific value or greater exerted high hydrocarbon adsorbability.

On the other hand, the compositions of Comparative Examples 1 to 5 using zeolite that was of a BEA type but having a maintaining factor of the specific surface area of less than the specific value, and the compositions of Comparative Examples 6 and 8 containing no phosphorus did not exert HC adsorbability as in the examples, or merely exerted HC adsorbability that was significantly inferior to those in the examples. Furthermore, the compositions of Comparative Examples 7 and 9 having an amount of phosphorus and a maintaining factor of the specific values or greater, but using non-BEA zeolite barely exerted hydrocarbon adsorbability.

As described above, it is clear that, if the composition of the present invention contains BEA zeolite containing at least the specific amount of phosphorus, and has a specific surface area maintaining factor of the specific value or of pure water. 10 g of proton-type BEA zeolite (pore diameter 0.65 nm, $SiO_2/Al_2O_3$ molar ratio 40, specific surface area 595 m²/g) was put into the obtained suspension, and stirred at room temperature (20° C.) for 4 hours. The obtained slurry was filtered, dried at 120° C. for 12 hours, and then fired under atmospheric pressure at 600° C. for 3 hours, and thus a powder-like exhaust gas purifying composition was obtained.

Comparative Example 10

A powder-like exhaust gas purifying composition was obtained as in Example 8, except that phosphoric acid and zirconium oxynitrate were not used.

Comparative Example 11

A powder-like exhaust gas purifying composition was obtained as in Example 9, except that phosphoric acid and zirconium oxynitrate were not used The maintaining factor $R_d$ of the crystallite diameter of each of the exhaust gas purifying compositions of Examples 1 to 9 and Comparative Examples 1 to 11 was measured using the following method. Furthermore, the $SiO_2/Al_2O_3$ molar ratio of each of the exhaust gas purifying compositions of Examples 8 and 9 and Comparative Examples 10 and 11 was measured using the above-described method, the phosphorus content and the zirconium content thereof were measured using the above-described method, and the toluene adsorbability thereof was measured using the above-described method. Table 2 below shows the results. Table 2 also shows the already measured $SiO_2/Al_2O_3$ molar ratio, phosphorus content and zirconium content, and toluene adsorption amount according to Examples 1 to 7 and Comparative Examples 1 to 9.

Maintaining Factor $R_d$ of Crystallite Diameter

When the crystallite diameter of zeolite in the exhaust gas purifying composition after the heat resistance test was taken as X nm, and the crystallite diameter of zeolite in the exhaust gas purifying composition before the test was taken as Y nm, the maintaining factor was obtained as X/Y×100 (%). The crystallite diameter was evaluated by performing X-ray diffraction measurement under the following conditions, and using Scherrer equation (D=Kλ/(β cos θ)) using the half width of a main peak of zeolite in a scanning range of 21 to 24°. In the equation, D is the crystallite diameter, λ is the X-ray wavelength, β is the diffraction line broadening (half width), θ is the diffraction angle, and K is a constant. The half width was obtained by taking K as 0.94. The X-ray diffraction was performed using a MicroFlex600 manufactured by Rigaku Corporation. A Cu tube was used as the source. The measurement was performed at a tube voltage of 40 kV, a tube current of 15 mA, and a scanning speed of 10 deg/min.

phosphorus, or containing phosphorus merely in an amount out of the range of the present invention were significantly inferior to the examples in terms of the HC adsorbability. Furthermore, it is seen that the composition of Comparative Example 9 containing phosphorus in an amount within the specific range but having a maintaining factor of the crystallite diameter out of the range of the present invention, and the composition of Comparative Example 7 having a post-heating crystallite diameter greater than the upper limit of the present invention were inferior to the examples in terms of toluene adsorbability.

As described above, it is clear that, if the composition of the present invention uses zeolite containing the specific amount of phosphorus, and has a maintaining factor of the crystallite diameter of the specific value or greater and a post-heating crystallite diameter of the specific value or less, synergistic effects of improving the HC adsorbability can be achieved, which is useful for exhaust gas purification.

Example 10

A powder-like exhaust gas purifying composition was obtained as in Example 1, except that the amount of zirconium oxynitrate $(ZrO(NO_3)_2 \cdot 2H_2O)$ was changed to 0.61 g.

Example 11

A powder-like exhaust gas purifying composition was obtained as in Example 1, except that the amount of zirconium oxynitrate $(ZrO(NO_3)_2 \cdot 2H_2O)$ was changed to 1.22 g.

Example 12

A powder-like exhaust gas purifying composition was obtained as in Example 1, except that the amount of zirconium oxynitrate $(ZrO(NO_3)_2 \cdot 2H_2O)$ was changed to 4.90 g.

TABLE 2

| | | Exhaust gas purifying composition | | | | | | |
|---|---|---|---|---|---|---|---|---|
| | Zeolite type | $SiO_2/Al_2O_3$ molar ratio | P/Al | Zr/Al | Crystallite diameter before heating (nm) Y | Crystallite diameter after heating (nm) X | Maintaining factor $R_d$ (X/Y) | Toluene adsorption amount (a.u.) |
| Ex. 1 | BEA | 35 | 0.5 | 1 | 17.12 | 13.51 | 78.9% | 71.7 |
| Ex. 2 | BEA | 35 | 1 | 1 | 17.59 | 14.87 | 84.5% | 100.0 |
| Ex. 3 | BEA | 35 | 2 | 1 | 17.30 | 12.85 | 74.3% | 117.8 |
| Ex. 4 | BEA | 35 | 4 | 1 | 18.00 | 13.65 | 75.8% | 75.9 |
| Ex. 5 | BEA | 35 | 2 | 2 | 18.28 | 14.67 | 80.2% | 92.0 |
| Ex. 6 | BEA | 35 | 4 | 4 | 18.42 | 15.55 | 84.4% | 48.8 |
| Ex. 7 | BEA | 35 | 1 | 0 | 15.12 | 12.61 | 83.4% | 76.9 |
| Ex. 8 | BEA | 38 | 1 | 1 | 13.27 | 11.37 | 85.7% | 174.5 |
| Ex. 9 | BEA | 40 | 1 | 1 | 27.08 | 20.88 | 77.1% | 56.4 |
| Com.Ex. 1 | BEA | 35 | 0 | 0 | 18.55 | 1.90 | 10.2% | 0.0 |
| Com.Ex. 2 | BEA | 35 | 0 | 1 | 15.54 | 13.84 | 89.0% | 10.4 |
| Com.Ex. 3 | BEA | 35 | 0.25 | 1 | 17.71 | 1.91 | 10.8% | 0.1 |
| Com.Ex. 4 | BEA | 35 | 10 | 1 | 16.37 | 12.75 | 77.9% | 24.6 |
| Com.Ex. 5 | BEA | 35 | 10 | 10 | 17.10 | 12.29 | 71.9% | 12.7 |
| Com.Ex. 6 | CHA (SSZ13) | 29 | 0 | 0 | 38.60 | 33.00 | 85.5% | 0.0 |
| Com.Ex. 7 | CHA (SSZ13) | 29 | 1 | 1 | 40.10 | 30.44 | 75.9% | 0.0 |
| Com.Ex. 8 | CHA (SAPO34) | 0.4 | 0 | 0 | 33.70 | 8.50 | 25.2% | 0.0 |
| Com.Ex. 9 | CHA (SAPO34) | 0.4 | 1 | 1 | 28.70 | 13.57 | 47.3% | 0.0 |
| Com.Ex. 10 | BEA | 38 | 0 | 0 | 14.58 | 1.15 | 7.9% | 0.0 |
| Com.Ex. 11 | BEA | 40 | 0 | 0 | 25.28 | 6.64 | 26.3% | 0.0 |

It is seen from Table 2 that the compositions of the examples using BEA zeolite containing the specific amount of phosphorus and having a maintaining factor of the crystallite diameter of the specific value or greater exerted high hydrocarbon adsorbability.

On the other hand, it is seen that the compositions of Comparative Examples 1 to 6, 8, 10, and 11 containing no The exhaust gas purifying compositions obtained in Examples 10 to 12 were evaluated as in Examples 1 to 9 in terms of the $SiO_2/Al_2O_3$ molar ratio, the phosphorus content and the zirconium content, the maintaining factor $R_S$ of the specific surface area, the maintaining factor $R_d$ of the crystallite diameter, and the toluene adsorbability. Tables 3 and 4 below show the results.

TABLE 3

| | Exhaust gas purifying composition | | | | | | | |
|---|---|---|---|---|---|---|---|---|
| | Zeolite type | Pore diameter (nm) | SiO$_2$/Al$_2$O$_3$ molar ratio | P/Al | Zr/Al | Specific surface area before heating (m$^2$/g) B | Specific surface area after heating (m$^2$/g) A | Maintaining factor R$_s$ (A/B) | Toluene adsorption amount (a.u.) |
| Ex. 10 | BEA | 0.65 | 35 | 1 | 0.25 | 633.4 | 369.7 | 58.4% | 82.71 |
| Ex. 11 | BEA | 0.65 | 35 | 1 | 0.5 | 613.9 | 372.0 | 60.6% | 87.40 |
| Ex. 12 | BEA | 0.65 | 35 | 1 | 2 | 583.8 | 216.1 | 37.0% | 37.66 |

TABLE 4

| | Exhaust gas purifying composition | | | | | | |
|---|---|---|---|---|---|---|---|
| | Zeolite type | SiO$_2$/Al$_2$O$_3$ molar ratio | P/Al | Zr/Al | Crystallite diameter before heating (nm) Y | Crystallite diameter after heating (nm) X | Maintaining factor R$_d$ (X/Y) | Toluene adsorption amount (a.u.) |
| Ex. 10 | BEA | 35 | 1 | 0.25 | 18.46 | 13.73 | 74.4% | 82.71 |
| Ex. 11 | BEA | 35 | 1 | 0.5 | 18.48 | 15.67 | 84.8% | 87.40 |
| Ex. 12 | BEA | 35 | 1 | 2 | 17.69 | 14.75 | 83.4% | 37.66 |

It is seen from Table 3 that, if BEA zeolite containing the specific amount of phosphorus and having a maintaining factor of the specific surface area of the specific value or greater is used, high hydrocarbon adsorbability is obtained.

Furthermore, it is seen from Table 4 that, if BEA zeolite containing the specific amount of phosphorus, having a crystallite diameter X of the specific value or less, and having a maintaining factor of the crystallite diameter of the specific value or greater is used, high hydrocarbon adsorbability is obtained.

INDUSTRIAL APPLICABILITY

The present invention provides an exhaust gas purifying composition having excellent HC adsorbability for exhaust gas purification in internal combustion engines such as gasoline engines.

The invention claimed is:

1. An exhaust gas purifying composition comprising BEA zeolite containing phosphorus and zirconium, wherein
an amount of phosphorus contained in the zeolite is such that a molar ratio (P/Al) thereof with respect to Al in the zeolite is 0.5 or greater, and an amount of zirconium contained in the zeolite is such that a molar ratio (Zr/Al) thereof with respect to Al in the zeolite is 0.25 or greater, and
when (a1) A represents a specific surface area of the exhaust gas purifying composition after heating at 980° C. for 25 hours, and (a2) B represents a specific surface area of the exhaust gas purifying composition before the heating,
a maintaining factor R$_S$ of a specific surface area of the exhaust gas purifying composition represented by A/B×100(%) is 35% or greater.

2. An exhaust gas purifying composition comprising BEA zeolite containing phosphorus, wherein
an amount of phosphorus is such that a molar ratio thereof with respect to Al in the zeolite is from 0.5 to 8, and an amount of zirconium contained in the zeolite is such that a molar ratio (Zr/Al) thereof with respect to Al in the zeolite is 0.25 or greater, and
when (b1) X represents a crystallite diameter of the zeolite after heating the exhaust gas purifying composition at 980° C. for 25 hours, and (b2) Y represents a crystallite diameter of the zeolite before the heating,
X is 25 nm or less, and a maintaining factor R$_d$ of a crystallite diameter represented by X/Y×100(%) is 50% or greater.

3. The exhaust gas purifying composition according to claim 1, wherein
an amount of phosphorus is such that a molar ratio (P/Al) thereof with respect to Al in the zeolite is from 1 to 3.

4. The exhaust gas purifying composition according to claim 2, wherein X is 15 nm or less.

5. An exhaust gas purification method, using a composition comprising BEA zeolite containing phosphorus and zirconium, wherein,
in the composition, an amount of phosphorus contained in the zeolite is such that a molar ratio (P/Al) thereof with respect to Al in the zeolite is 0.5 or greater, and an amount of zirconium contained in the zeolite is such that a molar ratio (Zr/Al) thereof with respect to Al in the zeolite is 0.25 or greater, and
when (a1) A represents a specific surface area of the composition after heating at 980° C. for 25 hours, and (a2) B represents a specific surface area of the composition before the heating,
a maintaining factor R$_S$ of a specific surface area of the composition represented by A/B×100(%) is 35% or greater.

6. An exhaust gas purification method, using a composition comprising BEA zeolite containing phosphorus and zirconium, wherein,
in the composition, an amount of phosphorus contained in the zeolite is such that a molar ratio (P/Al) thereof with respect to Al in the zeolite is from 0.5 to 8, and an amount of zirconium contained in the zeolite is such that a molar ratio (Zr/Al) thereof with respect to Al in the zeolite is 0.25 or greater, and
when (b1) X represents a crystallite diameter of the zeolite after heating the exhaust gas purifying composition at 980° C. for 25 hours, and (b2) Y represents a crystallite diameter of the zeolite before the heating, X is 25 nm or less, and a maintaining factor $R_d$ of a crystallite diameter represented by $X/Y \times 100(\%)$ is 50% or greater.

7. The exhaust gas purification method according to claim 5, comprising removing hydrocarbon contained in exhaust gas, the exhaust gas is emitted into an exhaust passage of an internal combustion engine.

8. The exhaust gas purifying composition according to claim 1, wherein an amount of zirconium contained in the zeolite is such that a molar ratio (Zr/Al) thereof with respect to Al in the zeolite is from 0.5 to 4.

9. The exhaust gas purifying composition according to claim 1, wherein the zirconium contained in the zeolite is supported by the zeolite.

* * * * *